(12) United States Patent
N et al.

(10) Patent No.: US 12,474,391 B2
(45) Date of Patent: Nov. 18, 2025

(54) SYSTEM AND METHODS FOR DETECTING A SWITCHING SEMICONDUCTOR IN CIRCUIT INTERRUPTERS

(71) Applicant: ABB Schweiz AG, Baden (CH)

(72) Inventors: Chandrashekar N, Hyderabad (IN); Hetul Patel, Waterford, CT (US)

(73) Assignee: ABB Schweiz AG, Baden (CH)

( * ) Notice: Subject to any disclaimer, the term of this patent is extended or adjusted under 35 U.S.C. 154(b) by 170 days.

(21) Appl. No.: 18/454,510

(22) Filed: Aug. 23, 2023

(65) Prior Publication Data

US 2025/0067788 A1 Feb. 27, 2025

(51) Int. Cl.
  *G01R 31/26* (2020.01)
  *G01R 19/165* (2006.01)
  *H03K 17/56* (2006.01)

(52) U.S. Cl.
  CPC ... *G01R 31/2607* (2013.01); *G01R 19/16533* (2013.01); *H03K 17/56* (2013.01)

(58) Field of Classification Search
  CPC .......... G01R 31/2607; G01R 19/16533; H03K 17/56
  See application file for complete search history.

(56) References Cited

U.S. PATENT DOCUMENTS

| 8,085,516 | B1 | 12/2011 | Armstrong | |
| 11,112,453 | B2 | 9/2021 | Ostrovsky et al. | |
| 2018/0278040 | A1* | 9/2018 | Hao | H02H 3/335 |
| 2019/0331734 | A1* | 10/2019 | Hanrahan | H02H 3/335 |

* cited by examiner

*Primary Examiner* — Stephanie E Bloss
*Assistant Examiner* — Michael A Harrison
(74) *Attorney, Agent, or Firm* — Leydig, Voit & Mayer, Ltd.

(57) ABSTRACT

A system to detect a status of a switching semiconductor in a switching circuit is provided. The system includes the switching semiconductor, an actuator, wherein the actuator is electrically coupled to a first end of the switching semiconductor, a resistor electrically coupled to a second end of the switching semiconductor, a switching device electrically coupled to the resistor, a detector connected to a collector terminal of the bi-polar junction transistor, and a processor. The processor is configured to provide a trigger voltage to the switching semiconductor, wherein the trigger voltage activates the switching semiconductor and induces current flow from the actuator through the resistor via the switching semiconductor. The processor activates the switching device, based on the activated switching semiconductor and detects a voltage at a collector terminal of the switching device. The processor determines the status of the switching semiconductor based on the detected voltage.

20 Claims, 5 Drawing Sheets

SYSTEM AND METHODS FOR DETECTING A SWITCHING SEMICONDUCTOR IN CIRCUIT INTERRUPTERS

FIELD

The present disclosure relates to a method and system for detecting a switching semiconductor. In particular, the present disclosure relates to detecting a switching semiconductor in ground-fault, arc-fault, dual-fault circuit interrupters.

BACKGROUND

Periodically detecting the presence of switching semiconductors in a circuit is part of a compliance requirement under UL943. Conventional systems and methods for detecting a switching semiconductor are bulky and costly, and are only able to function when silicon-controlled rectifiers (SCRs) are used as switching devices. Such conventional systems and methods are not able to detect other switching semiconductors used as switching devices. There is a need for a system and methods to detect any device used as a switching semiconductor in ground-fault, arc-fault, or dual-fault circuit interrupters.

SUMMARY

A first aspect of the present disclosure provides a system to detect a status of a switching semiconductor in a switching circuit. The system comprises: the switching semiconductor; an actuator, wherein the actuator is electrically coupled to a first end of the switching semiconductor; a resistor electrically coupled to a second end of the switching semiconductor; a switching device electrically coupled to the resistor; a detector connected to a collector terminal of the bi-polar junction transistor; and a processor configured to: provide a trigger voltage to the switching semiconductor, wherein the trigger voltage activates the switching semiconductor and induces current flow from the actuator through the resistor via the switching semiconductor; activate the switching device, based on the activated switching semiconductor; detect a voltage at a collector terminal of the switching device; and determine the status of the switching semiconductor based on the detected voltage.

According to an implementation of the first aspect, determining the status of the switching semiconductor further comprises determining that the switching semiconductor is operational based on determining that the detected voltage is low.

According to an implementation of the first aspect, the trigger voltage is applied at regular time intervals.

According to an implementation of the first aspect, determining the status of the switching semiconductor further comprises determining that the switching semiconductor is non-operational based on determining that the detected voltage is high for a predetermined number of consecutive time intervals.

According to an implementation of the first aspect, the switching semiconductor is at least one of a silicon controlled rectifier (SCR) or a triode for alternating current (TRIAC).

According to an implementation of the first aspect, the trigger voltage is provided to a gate terminal of the switching semiconductor.

According to an implementation of the first aspect, the trigger voltage is applied when a voltage measured at an anode terminal of the switching semiconductor is between 13-15 volts.

According to an implementation of the first aspect, the trigger voltage is applied for a predetermined period of time.

According to an implementation of the first aspect, the switching device is one of a bipolar junction transistor, a MOSFET, and a FET.

According to an implementation of the first aspect, the terminal of the switching device is a collector terminal of the bipolar junction transistor.

A second aspect of the present disclosure provides a method to detect a status of a switching semiconductor in a circuit. The method comprises: providing a trigger voltage to the switching semiconductor, wherein the trigger voltage activates the switching semiconductor and induces current to flow from an actuator electrically coupled to a first end of the switching semiconductor through a resistor electrically coupled to a second end of the switching semiconductor via the switching semiconductor; activating a switching device, based on the activated switching semiconductor, wherein the switching device is electrically coupled to the switching semiconductor; detecting the voltage at a collector terminal of the switching device; and determining the status of the switching conductor based on the detected voltage.

A third aspect of the present disclosure provides a non-transitory computer-readable medium having processor-executable instructions stored thereon. The processor-executable instructions, when executed by one or more processors, facilitate: providing a trigger voltage to the switching semiconductor, wherein the trigger voltage activates the switching semiconductor and induces current to flow from an actuator electrically coupled to a first end of the switching semiconductor through a resistor electrically coupled to a second end of the switching semiconductor via the switching semiconductor; activating a switching device, based on the activated switching semiconductor, wherein the switching device is electrically coupled to the switching semiconductor; detecting the voltage at a collector terminal of the switching device; and determining the status of the switching conductor based on the detected voltage.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

In order to comply with the Underwriters Laboratories (UL) Standard for Safety, circuit interrupters are required to periodically detect the presence of a switching semiconductor as part of the circuit interrupter. The detection process involves detecting that a switching semiconductor is connected to the circuit interrupter and is operational. Detecting switching semiconductors in circuit interrupter circuits is time consuming and resource intensive. Additionally, conventional methods to detect switching semiconductors in a circuit are only able to detect switching semiconductors when silicon-controlled rectifiers (SCRs) are used as switching semiconductors.

The present disclosure provides a system and method to detect a switching semiconductor in ground-fault, arc-fault, or dual-fault circuit interrupters. In order to accurately detect a switching semiconductor, a low value resistor is placed in series with a trip current path. The low voltage drop across the series resistor is used to trigger a detection circuit for obtaining a voltage reading variation that represents the presence of the switching semiconductor.

Figure 1:
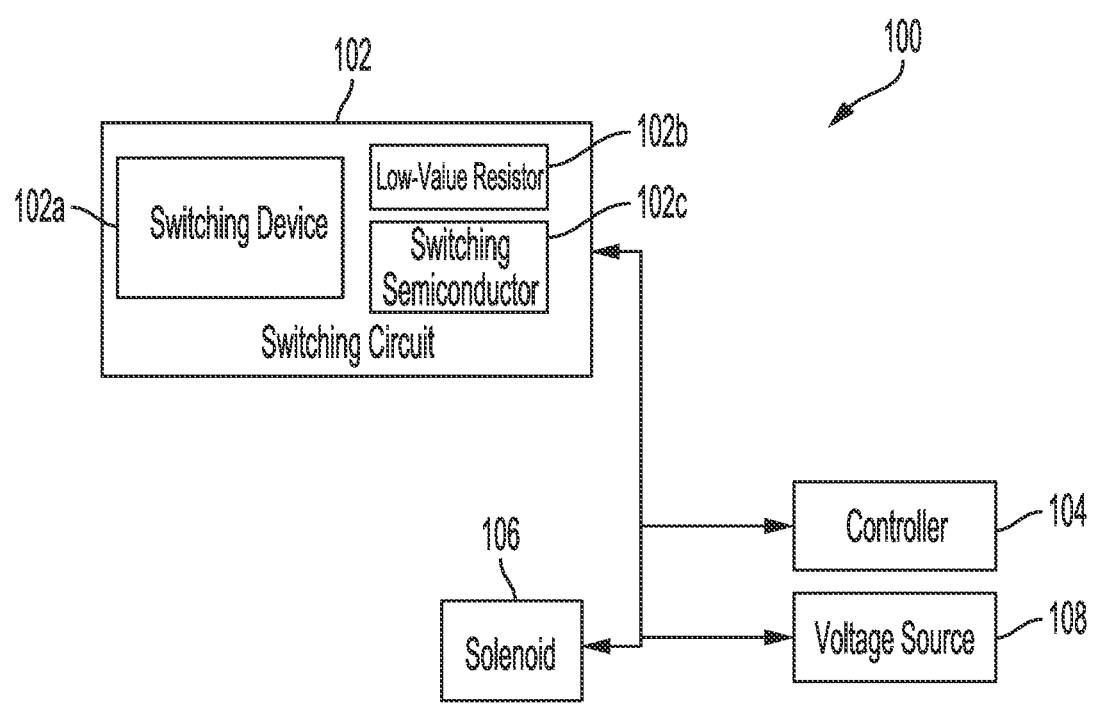
FIG. 1 illustrates a simplified block diagram depicting a system for detecting a switching semiconductor in circuit interrupters, according to one or more examples of the present disclosure.

FIG. 1 illustrates a simplified block diagram depicting a system for detecting a switching semiconductor in circuit interrupters, according to one or more examples of the present disclosure. System 100 of FIG. 1 includes a switching circuit 102, a controller 104, a voltage source 108, and a solenoid 106 that are part of a circuit interrupter. The switching circuit 102 includes a switching device 102a, a resistor 102b, and a switching semiconductor 102c. In some embodiments, the switching semiconductor 102c may be a silicon controlled rectifier (SCR) or a triode for alternating current (TRIAC).

In some embodiments, in order to detect the presence of the switching semiconductor 102c, the controller 104 sends a trigger signal to a gate terminal of a switching semiconductor 102c for a short time. In some embodiments, the trigger signal is provided to the gate terminal of the switching semiconductor 102c when a value of the voltage of the alternating current detected at the anode of the switching semiconductor is low enough to not activate a plunger of the circuit breaker. At the same time, the controller 104 ensures that the voltage at the anode of the switching semiconductor 102c should not be so low such that the switching semiconductor 102c cannot be momentarily turned 'ON' when triggered. For example, the trigger signal may be provided, when voltage detected at the anode of the switching semiconductor is approximately 13-15 volts (V).

The applied trigger signal instantly shorts the switching semiconductor 102c. Once shorted, current starts to flow through the path of current trip flow. In some embodiments, the path of the trip current is formed by solenoid 106 connected in series with a first terminal of the switching semiconductor 102c. The flow of current through the path of current trip flow, builds voltage across the low-voltage resistor 102b that is applied to a gate terminal of the switching device 102a. A collector terminal of the switching device 102a is connected to a power source 108. In some embodiments, the power source 108 provides a high voltage to the collector terminal of the switching device 102a. An emitter terminal of the switching device 102a is connected to ground. In some embodiments, any of the many different switching devices, such as a bipolar junction transistor, MOSFET or a FET may be used as the switching device.

The voltage that builds across the low-value resistor 102b activates the switching device 102a. In the activated stage, the output voltage across the switching device 102a instantly drops from high to low. In some other embodiments, the voltage across the activated transistor may also increase from low to high based on the configuration of the switching device 102a.

The voltage across the switching device 102a is provided to the controller 104. In some embodiments, the voltage across the switching device 102a is transmitted to the controller 104 via a pin of the controller 104 that is connected to the collector terminal of the switching device 102a. The fluctuation in voltage, whether it is from high to low, or low to high based on the configuration of the switching device 102a, in response to the applied trigger voltage, confirms that the switching semiconductor is connected to the interrupter circuit and is operational.

Figure 2:
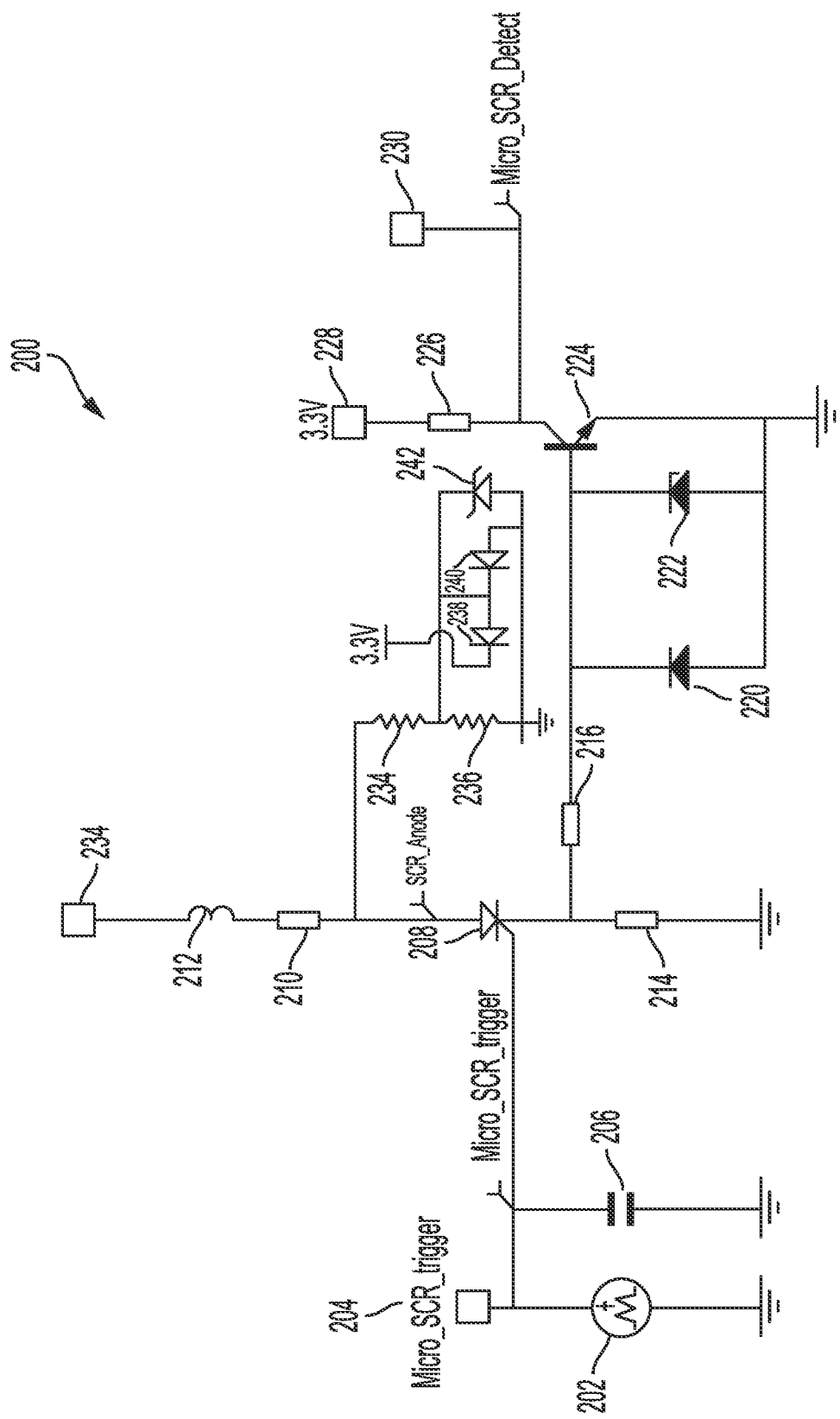
FIG. 2 illustrates a simplified circuit diagram for detecting a switching semiconductor in circuit interrupters, according to one or more examples of the present disclosure.

FIG. 2 depicts a portion of circuit diagram of an interrupter for detecting a switching semiconductor in circuit interrupters, according to one or more examples of the present disclosure. Circuit diagram 200 of FIG. 2 includes a trigger 202 and a trigger capacitor 206. The trigger 202 and the trigger capacitor 206 together provide the trigger signal from the controller 104 to the switching semiconductor 208. In some embodiments, trigger 202 may be connected to the switching semiconductor 102c via a pin 204 of the controller 104. Solenoid 212 and resistor 210 in combination represent solenoid 106 of FIG. 1. The solenoid 106 is connected on one end to a voltage source 234. In some embodiments, voltage source 234 may be line voltage, which may have a value of 120 V. Voltage source 234 is similar to voltage source 108 of FIG. 1. Switching semiconductor 208 is similar to switching semiconductor 102c of FIG. 1 and is connected in series with the solenoid 106 (composed of solenoid 212 and the resistor 210). Low-value resistor 214 is similar to low-value resistor 102b. The trigger signal, received from the trigger element 204 shorts the switching semiconductor 208 and allows for current to flow through the solenoid 106 (composed of elements 212 and 210), the switching semiconductor 208, and the low-value resistor 214. As the current flows through the low-value resistor 214, a voltage builds across the low-value resistor 214 that acts as an input to a switching circuit.

In some embodiments, voltage at the anode terminal of the switching semiconductor is measured using a measuring circuit. The measuring circuit is composed of resistors 234, 236, and diodes 238, 240, and 242.

The switching circuit is composed of diodes 220 and 222, bipolar junction transistor 224, resistors 216 and 226, and the power source 234. The bipolar junction transistor 224 is similar to switching device 102a of FIG. 1. A gate terminal of the bipolar junction transistor 224 is connected to a terminal of the low-value resistor 214. The voltage across the low-value resistor 214 acts as a gate input voltage to the bipolar junction transistor 224. A collector terminal of the bipolar junction transistor 224 is connected to the power source 228 via resistor 226. In some embodiments, the power source 228 may provide a high voltage of 3.3 V. In some other cases, the power source 228 may provide a high voltage of 5 V. An emitter terminal of the bipolar junction transistor 224 is connected to ground. Controller 104 is connected to the collector terminal of the bipolar junction transistor 224 via a pin 230 of controller 104. Controller 104 is configured to measure the voltage across the bipolar junction transistor 224. In cases where the bipolar junction transistor 224 is not active, the voltage across the bipolar junction transistor 224 is equivalent to the high voltage 228 connected to the collector terminal of the bipolar junction transistor 224. In cases where the bipolar junction transistor 224 is active, the voltage across the bipolar junction transistor 224 is low. In some embodiments, in response to the trigger signal received, the switching semiconductor 208 may be shorted and current flowing through the switching semiconductor 208 and the low-value resistor 204 may develop a voltage across the low-value resistor 214. The voltage across the low-value resistor 214 may activate the bipolar junction transistor 224. The activation of the bipolar junction transistor instantly drops the voltage across the bipolar junction transistor 224 from high value to a low value.

The voltage across the bipolar junction transistor 224 will remain at the low-value as long as the bipolar junction transistor 224 is active. The bipolar junction transistor 224 will remain active as long as there is a build-up of voltage across the low-value resistor 214. The build-up of voltage across the low-value resistor 214 will be created as long as there is current flowing through the low-value resistor 214. Current flows through low-value resistor 214 as long as the switching semiconductor is shorted based on the trigger voltage that was applied to the switching semiconductor 208 from the controller 104. In some embodiments, the trigger voltage is applied to the switching semiconductor for a short period of time, approximately 15 microseconds.

As long as the trigger voltage is applied to the switching semiconductor (approx. 15 microseconds), the voltage across the bipolar junction transistor 224 flips from a high value to a low value or low to high depending on the configuration of the bipolar junction transistor 224.

When the controller 104 detects the flip in the voltage at the bipolar junction transistor 224, upon application of the trigger voltage from the controller 104, the controller 104 determines that the switching semiconductor is connected to the interrupter circuit and is operational. In case the controller does not detect the flip in the voltage at the bipolar junction transistor 224, upon application of the trigger voltage, the controller 104 may determine that the switching semiconductor 208 is not connected to the interrupter circuit, or is not operational.

In accordance with the standards, the controller 104 is required to check for the presence of the switching semiconductor 208 periodically. In some embodiments, the controller 104 may apply the trigger voltage to detect the presence of the switching semiconductor 208 every 1 second, every 2 second, 4 second, etc. In case the controller does not detect the switch in voltage at the bipolar junction transistor 224 upon application of the trigger voltage three consecutive, the controller 104 may determine that the switching semiconductor 208 has failed. In some embodiments, the determination of failure of the switching semiconductor 224 may be communicated through an LED signal to an operator of the system 100.

FIGS. 3A-3D depict graphs related to detecting a switching semiconductor in circuit interrupters, according to one or more examples of the present disclosure. FIGS. 3A-3D plot voltage on the y-axis and time in microseconds on the x-axis.

Figure 3A:
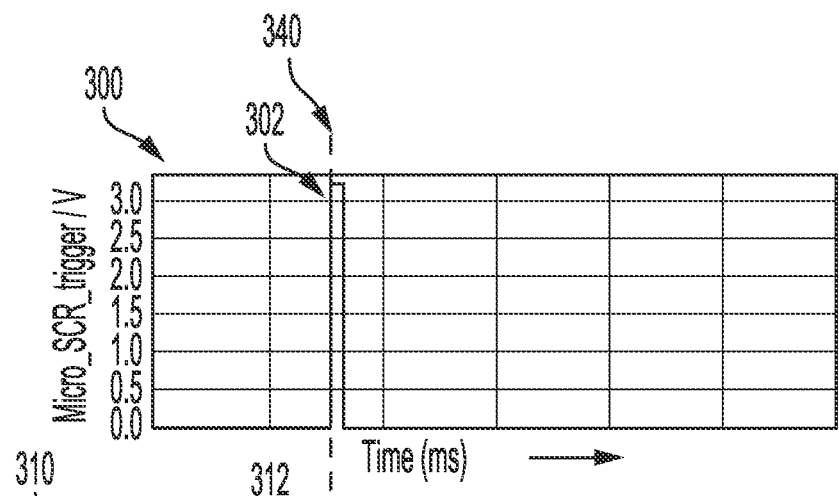
FIGS. 3A-3D depict graphs related to detecting a switching semiconductor in circuit interrupters, according to one or more examples of the present disclosure.

FIG. 3A depicts a simplified graph 302 of voltage measured at the controller 104 when the controller 104 provides the trigger voltage to the switching semiconductor 102c. In some embodiments, the trigger voltage may be measured at a pin of controller 104 through which the trigger voltage is applied to the switching semiconductor 102c. Graph 300 depicts a spike 302 that indicates a trigger voltage applied to the switching semiconductor. As shown in graph 300, the trigger voltage is applied for a very short period of time by controller 104. For example, the controller 104 may be configured to apply the trigger voltage may be applied for a period of 10-15 microseconds. Additionally, the controller 104 may be configured to apply the trigger voltage at regular intervals of 1 second, 2 seconds, three seconds, for example.

Figure 3B:
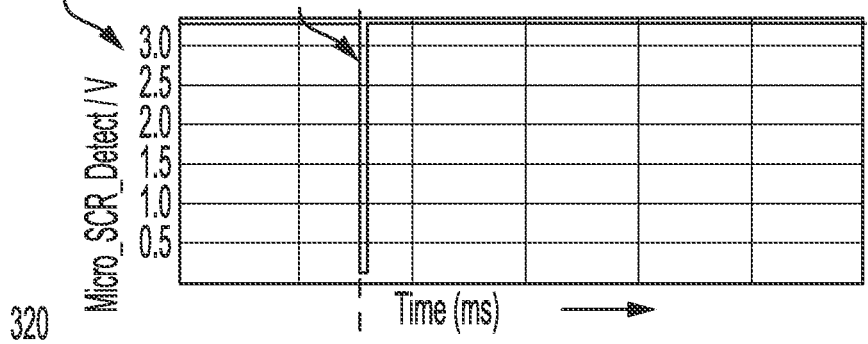

FIG. 3B depicts a simplified graph 310 of voltage measured at a collector terminal of the switching device 102a. As the switching device 102a is configured in FIG. 2, the default value of the voltage across the switching device 102a is high. In some embodiments, the high voltage may be 3.3 V. Graph 310 depicts a sharp dip in voltage at 312. In some embodiments, the sharp dip in voltage 312 is created when a voltage that builds up across the low-value resistor 102c is connected to the switching semiconductor 102b in series, which activates the switching device 102a. In such embodiments, the value of voltage at 312, may be calculated based on the value of resistor 226 and the high value of voltage provided by power source 108. For example, the value across the switching device 102a, when activated may be approximately 0.2 V. As is visible in graphs 300 and 310, the time at which the sharp dip in voltage 312 occurs, depicted by time 340, coincides with the time when the trigger voltage 302 is applied by the controller 104 to the switching semiconductor 102c.

Figure 3C:
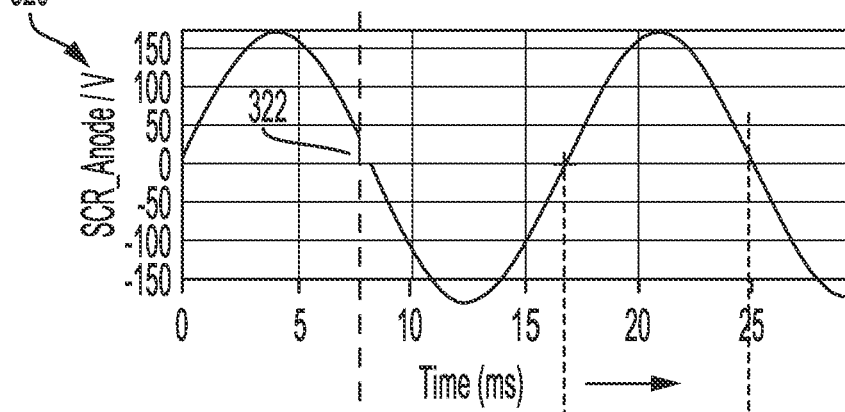
Figure 3D:
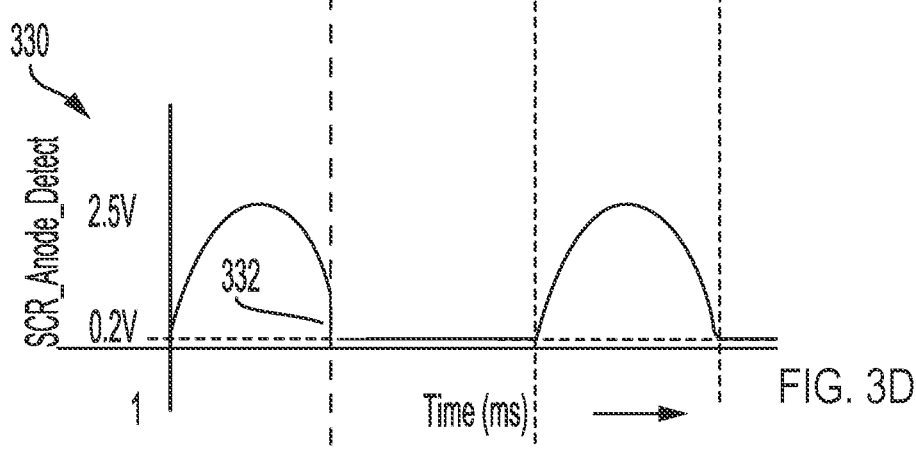

FIGS. 3C and 3D depict simplified graphs 320 and 330 that plot voltage measured at an anode terminal of the switching semiconductor. As is seen from graph 320 of FIG. 3C, alternating current is applied to the switching semiconductor 102b which is connected to solenoid 106. Graph 330 of FIG. 3D is similar to graph 320 of FIG. 3C except that it depicts a reduced amplitude of the alternating current, and only depicts the positive parts of the alternating current applied to the switching semiconductor 102c. In some embodiments, the graph 330 of FIG. 3D is measured using the measuring circuit as shown in FIG. 2.

Graph 320 of FIG. 3C, depicts a kink 322. Kink 322 reflects a temporary shorting of the switching semiconductor 102c. The switching semiconductor 102c is shorted when a trigger voltage is applied to the switching semiconductor 102c by controller 104, as depicted by 302 in graph 3A. A similar kink 334 is present in graph 330 of FIG. 3D, that represents only positive portions of a reduced amplitude of the graph 320. When the switching semiconductor 102c is shorted, current flows through the low-value resistor 102b and a voltage builds across the low-value resistor 102b that activates the switching device 102a. In response to the activation, the voltage across the switching device 102a experiences a sharp dip in voltage as depicted by 312 in graph 3B.

Figure 4:
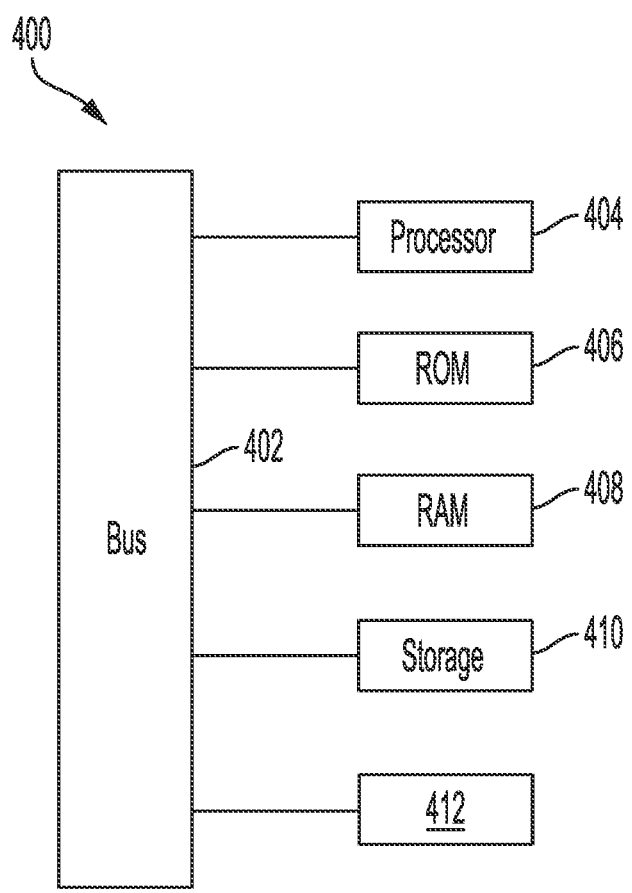
FIG. 4 is a simplified block diagram of one or more devices or systems within the exemplary environment of FIG. 1, according to one or more examples of the present disclosure.

FIG. 4 is a block diagram of an exemplary system or device 400 within the system 100 such as the controller 104. The system 400 includes a processor 404, such as a central processing unit (CPU), and/or logic, that executes computer executable instructions for performing the functions, processes, and/or methods described herein. In some examples, the computer executable instructions are locally stored and accessed from a non-transitory computer readable medium, such as storage 410, which may be a hard drive or flash drive. Read Only Memory (ROM) 406 includes computer executable instructions for initializing the processor 404, while the random-access memory (RAM) 408 is the main memory for loading and processing instructions executed by the processor 404. The network interface 412 may connect to a wired network or cellular network and to a local area network or wide area network. The system 400 may also include a bus 402 that connects the processor 404, ROM 406, RAM 408, storage 410, and/or the network interface 412. The components within the system 400 may use the bus 402 to communicate with each other. The components within the system 400 are merely exemplary and might not be inclusive of every component within the controller 104. Additionally, and/or alternatively, the system 400 may further include components that might not be included within every entity of system 100. For instance, in some examples, the controller 104 might not include a network interface 412.

Figure 5:
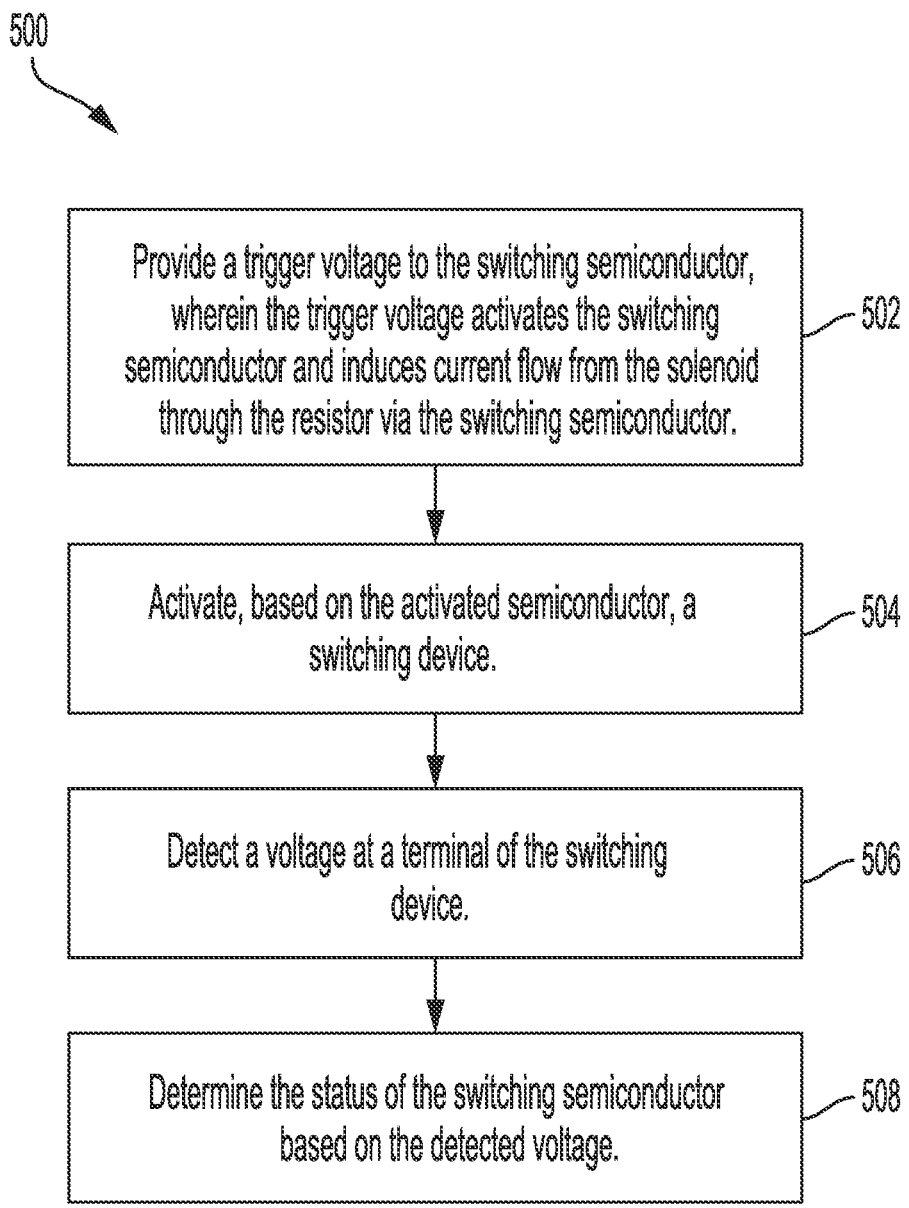
FIG. 5 is a flow chart of an exemplary process for detecting a switching semiconductor in circuit interrupters, according to one or more examples of the present disclosure.

FIG. 5 illustrates an exemplary process for detecting a switching semiconductor in circuit interrupters, according to one or more examples of the present disclosure. The process 500 may be performed by the controller 104 of system 100 shown in FIG. 1. However, it will be recognized that any of the following blocks may be performed in any suitable order and that the process 500 may be performed in any environment and by any suitable computing device and/or controller.

At block 502, the controller 104 provides a trigger voltage to a switching semiconductor, wherein the trigger voltage activates the switching semiconductor and induces current flow from a solenoid through the resistor via the switching semiconductor. For example, the controller 104 applies a trigger voltage to the switching semiconductor 102c. The switching semiconductor 102c is connected in series with a solenoid 106 on one end. The other end of the switching semiconductor 102c is connected to a low-value resistor 102b. The applied trigger voltage shorts the switching semiconductor 102c and current flows through the switching semiconductor 102c and the low-value resistor 102b connected in series with the switching semiconductor 102c.

At block 504, the controller 104 activates, based on the activated switching semiconductor, a switching device. For example, as current flows through the low-value resistor 102b, a voltage builds up across the low-value resistor 102b. The voltage that builds up across the low-value resistor 102c is provided to a gate terminal of a switching device 102a. The voltage activates the switching device 102a.

At block 506, the controller 104 detects a voltage at a collector terminal of the switching device. For example, a collector terminal of the switching device 102a may be connected to a pin of controller 104. Controller 104 may receive the voltage from the switching device 102a.

At block 508, the controller 104 determines a status of the switching semiconductor based on the detected voltage. For example, the controller 104 may determine a sharp decrease in voltage across the switching device 102a, that coincides with the time when the trigger voltage is applied to the switching semiconductor 102c. Upon detection of the sharp decrease in voltage, the controller 104 determines that the switching semiconductor 102c is operational and in good health. In case the controller 104 does not detect the sharp decrease in voltage for three consecutive time periods in a row, in response to the applied trigger voltage, the controller 104 determines that there is a defect in the switching semiconductor 104.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A system to detect a status of a switching semiconductor in a switching circuit, the system comprising:
   the switching semiconductor;
   an actuator, wherein the actuator is electrically coupled to a first end of the switching semiconductor;
   a resistor electrically coupled to a second end of the switching semiconductor;
   a switching device electrically coupled to the resistor;
   a detector connected to a collector terminal of the switching device; and
   a processor configured to:
      provide a trigger voltage to the switching semiconductor, wherein the trigger voltage activates the switching semiconductor and induces current flow from the actuator through the resistor via the switching semiconductor;
      activate the switching device, based on the activated switching semiconductor;
      detect a voltage at a terminal of the switching device; and
      determine the status of the switching semiconductor based on the detected voltage.

2. The system of claim 1, wherein determining the status of the switching semiconductor further comprises:
   determining that the switching semiconductor is operational based on determining that the detected voltage is low.

3. The system of claim 2, wherein the trigger voltage is applied at regular time intervals.

4. The system of claim 3, wherein determining the status of the switching semiconductor further comprises:
   determining that the switching semiconductor is non-operational based on determining that the detected voltage is high for a predetermined number of consecutive time intervals.

5. The system of claim 1, wherein the switching semiconductor is at least one of a silicon controlled rectifier (SCR) or a triode for alternating current (TRIAC).

6. The system of claim 1, wherein the trigger voltage is provided to agate terminal of the switching semiconductor.

7. The system of claim 1, wherein the trigger voltage is applied when a voltage measured at an anode terminal of the switching semiconductor is between 13-15 volts.

8. The system of claim 1, wherein the trigger voltage is applied for a predetermined period of time.

9. The system of claim 1, wherein the switching device is one of a bipolar junction transistor, a MOSFET, and a FET.

10. The system of claim 9, wherein the terminal of the switching device is a collector terminal of the bipolar junction transistor.

11. A method to detect a status of a switching semiconductor in a circuit, the method comprising:
provide a trigger voltage to the switching semiconductor, wherein the trigger voltage activates the switching semiconductor and induces current to flow from an actuator electrically coupled to a first end of the switching semiconductor through a resistor electrically coupled to a second end of the switching semiconductor via the switching semiconductor;
activating a switching device, based on the activated switching semiconductor, wherein the switching device is electrically coupled to the switching semiconductor;
detecting a voltage at a terminal of the switching device; and
determining the status of the switching semiconductor based on the detected voltage.

12. The method of claim 11, wherein determining the status of the switching semiconductor further comprises:
determining that the switching semiconductor is operational based on determining that the detected voltage is low.

13. The method of claim 12, wherein the trigger voltage is applied at regular time intervals.

14. The method of claim 13, wherein determining the status of the switching semiconductor further comprises:
determining that the switching semiconductor is non-operational based on determining that the detected voltage is high for a predetermined number of consecutive time intervals.

15. The method of claim 11, wherein the switching semiconductor is at least one of a silicon controlled rectifier (SCR) or a triode for alternating current (TRIAC).

16. The method of claim 11, wherein the trigger voltage is provided to a gate terminal of the switching semiconductor.

17. The method of claim 11, wherein the trigger voltage applied when a voltage measured at an anode terminal of the switching semiconductor is between 13-15 volts.

18. The method of claim 11, wherein the trigger voltage is applied for a predetermined period of time.

19. The method of claim 11, wherein the switching device is one of a bipolar junction transistor, a MOSFET, and a FET.

20. A non-transitory computer-readable medium having processor-executable instructions stored thereon, wherein the processor-executable instructions, when executed by one or more processors, facilitate:
providing a trigger voltage to a switching semiconductor, wherein the trigger voltage activates the switching semiconductor and induces current to flow from an actuator electrically coupled to a first end of the switching semiconductor through a resistor electrically coupled to a second end of the switching semiconductor via the switching semiconductor;
activating a switching device, based on the activated switching semiconductor, wherein the switching device is electrically coupled to the switching semiconductor;
detecting a voltage at a terminal of the switching device; and
determining a status of the switching semiconductor based on the detected voltage.

* * * * *